(12) United States Patent
Smycek

(10) Patent No.: US 10,144,069 B2
(45) Date of Patent: Dec. 4, 2018

(54) INDEXABLE MILLING INSERT HAVING SIDE SUPPORTING VALLEY, AND A MILLING TOOL

(71) Applicant: PRAMET TOOLS, S.R.O., Sumperk (CZ)

(72) Inventor: Pavel Smycek, Zabrech (CZ)

(73) Assignee: PRAMET TOOLS, S.R.O., Sumperk (CZ)

( * ) Notice: Subject to any disclaimer, the term of this patent is extended or adjusted under 35 U.S.C. 154(b) by 172 days.

(21) Appl. No.: 14/892,554

(22) PCT Filed: May 16, 2014

(86) PCT No.: PCT/EP2014/060037
§ 371 (c)(1),
(2) Date: Nov. 19, 2015

(87) PCT Pub. No.: WO2014/187736
PCT Pub. Date: Nov. 27, 2014

(65) Prior Publication Data
US 2016/0107248 A1    Apr. 21, 2016

(30) Foreign Application Priority Data
May 21, 2013 (EP) ..................................... 13168526

(51) Int. Cl.
*B23C 5/20* (2006.01)

(52) U.S. Cl.
CPC .............. *B23C 5/207* (2013.01); *B23C 5/202* (2013.01); *B23C 2200/0411* (2013.01);
(Continued)

(58) Field of Classification Search
CPC . B23C 5/207; B23C 5/202; B23C 2200/0477; B23C 2200/0483;
(Continued)

(56) References Cited

U.S. PATENT DOCUMENTS 3,629,919 A * 12/1971 Trevarrow, Jr. ......... B23B 27/06
407/103
5,503,509 A *  4/1996 von Haas ............... B23B 51/048
408/188

(Continued)

FOREIGN PATENT DOCUMENTS

DE          9215855 U1 *  3/1994  ........... B23C 5/2213
DE       10018452 A1 * 10/2001  ........... B23B 27/141
(Continued)

*Primary Examiner* — Ryan Rufo
(74) *Attorney, Agent, or Firm* — Corinne R. Gorski

(57) ABSTRACT

Milling inserts having surfaces designed for supporting the insert relative to a milling cutter body, and a milling tool are provided. The milling insert has a first end surface, a second end surface, and a side surface extending between the first end surface and the second end surface At least one cutting edge is defined by an intersection of at least one of the first end surface and the second end surface with the side surface. The at least one cutting edge includes a radiused component having a first end and a second end and first and second components at the first and the second ends of the radiused component, respectively. The first and second components are less curved than the radiused component. The side surface has at least one substantially V-shaped valley formed by first and second support surfaces.

13 Claims, 4 Drawing Sheets

(52) U.S. Cl.
CPC ......... *B23C 2200/0416* (2013.01); *B23C 2200/0483* (2013.01); *B23C 2200/086* (2013.01); *B23C 2200/128* (2013.01); *B23C 2200/165* (2013.01); *B23C 2200/168* (2013.01); *B23C 2200/201* (2013.01); *B23C 2200/203* (2013.01)

(58) Field of Classification Search
CPC ........ B23C 2200/168; B23C 2200/165; B23C 2200/161; B23C 2200/201; B23C 2200/203; B23C 2200/086; B23C 2200/082; B23C 2200/128; B23B 27/16; B23B 27/1659; B23B 27/1625; B23B 2200/049; B23B 2200/0495; B23B 2200/0419; B23B 2200/165; B23B 2200/201
See application file for complete search history.

(56) References Cited

U.S. PATENT DOCUMENTS

| | | | | |
|---|---|---|---|---|
| 5,695,303 | A * | 12/1997 | Boianjiu | B23B 27/141 407/114 |
| 5,820,310 | A | 10/1998 | Boianjiu | |
| 5,921,721 | A | 7/1999 | Hintze et al. | |
| 6,527,486 | B2 * | 3/2003 | Wiman | B23B 27/141 407/113 |
| 9,421,614 | B2 * | 8/2016 | Morgulis | B23C 27/065 |
| 2003/0031520 | A1 * | 2/2003 | Hintze | B23B 27/141 407/114 |
| 2010/0266353 | A1 * | 10/2010 | Zitzlaff | B23B 27/145 407/113 |
| 2010/0329800 | A1 * | 12/2010 | Edler | B23B 27/145 407/114 |
| 2011/0142555 | A1 * | 6/2011 | Yamazaki | B23B 27/143 407/2 |
| 2012/0301235 | A1 * | 11/2012 | Yoshioka | B23C 5/06 407/100 |
| 2013/0101364 | A1 * | 4/2013 | Dufour | B23B 27/145 407/67 |
| 2013/0142580 | A1 | 6/2013 | Konta | |

FOREIGN PATENT DOCUMENTS

| | | | | |
|---|---|---|---|---|
| EP | 0162029 A2 * | 11/1985 | | .......... B23B 27/145 |
| EP | 0314647 A2 * | 5/1989 | | ............ B23C 5/202 |
| EP | 0730926 A1 | 9/1996 | | |
| EP | 1157768 A1 * | 11/2001 | | .......... B23C 5/2221 |
| EP | 1346789 A1 | 9/2003 | | |
| EP | 1795288 A1 | 6/2007 | | |
| EP | 1872889 A1 | 1/2008 | | |
| EP | 2335854 A2 | 6/2011 | | |
| EP | 2599571 A1 | 6/2013 | | |
| FR | 2955511 A1 * | 7/2011 | | ............... B23C 5/06 |
| GB | 2081142 A * | 2/1982 | | ......... B23B 27/1614 |
| JP | H6509518 A | 10/1994 | | |
| JP | H8243832 A | 9/1996 | | |
| JP | 200721623 A | 1/2007 | | |
| JP | 2007-075932 A * | 3/2007 | | ............ B23B 27/14 |
| JP | 200775932 A | 3/2007 | | |
| WO | 96/08331 A1 | 3/1996 | | |
| WO | WO 2008062825 A1 * | 5/2008 | | ......... B23B 27/1625 |
| WO | 2011047126 A1 | 4/2011 | | |
| WO | 2011089552 A1 | 7/2011 | | |
| WO | 2012043822 A1 | 4/2012 | | |

* cited by examiner

US 10,144,069 B2

INDEXABLE MILLING INSERT HAVING SIDE SUPPORTING VALLEY, AND A MILLING TOOL

RELATED APPLICATION DATA

This application is a § 371 National Stage Application of PCT International Application No. PCT/EP2014/060037 filed May 16, 2014 claiming priority of EP Application No. 13168526.5, filed May 21, 2013.

BACKGROUND AND SUMMARY

The present invention relates to cutting inserts and, more particularly, to milling inserts having surfaces designed for supporting of the insert relative to a milling cutter body, and a milling tool.

In machining of metal, such as during milling operations with a rotating tool having indexable and/or replaceable milling inserts, it is important to keep the milling inserts securely and accurately positioned relative to the milling cutter body. If an insert is not properly positioned or shifts slightly from its intended position during machining, it can result in damage to a workpiece and/or to the insert. Secure mounting of triangular or trigon inserts, such as WO2011/089552, can be problematic because, typically, a point of the triangle is oriented for performing a cutting operation, and the flat (or, in the case of a trigon, convex) side surface opposite the point must abut a side wall of a pocket of a milling cutter body to prevent the insert from moving relative to the milling cutter body. Because there may not be as many points of contact between the insert and the side wall of the milling cutter body as desired, or because the insert may have the ability to rotate slightly relative to the walls of the pocket, it can be difficult to properly position such inserts, or to maintain them in position once mounted.

Some inserts are provided with complex shapes on their bottom surfaces, and these complex shapes mate with similar, inverse complex shapes on the bottom surface of the milling cutter body pocket. In this way, the mating complex shapes facilitate preventing the insert from moving relative to the milling cutter body. A problem with such shapes, however, is that they can interfere with good contact between side supporting surfaces of the insert and side abutment surfaces of the milling cutter body pocket.

It is desirable to provide a milling insert that be securely and accurately mounted to a milling cutter body and that resists movement due to cutting forces during machining.

A milling insert according to an aspect of the present invention comprises a first end surface, a second end surface, a side surface extending between the first end surface and the second end surface, at least one cutting edge defined by an intersection of at least one of the first end surface and the second end surface with the side surface, the at least one cutting edge comprising a radiused component having a first end and a second end and first and second components at the first and the second ends of the radiused component, respectively, the first and second components being less curved than the radiused component, wherein the side surface comprises at least one concave valley formed by first and second support surfaces.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 3:
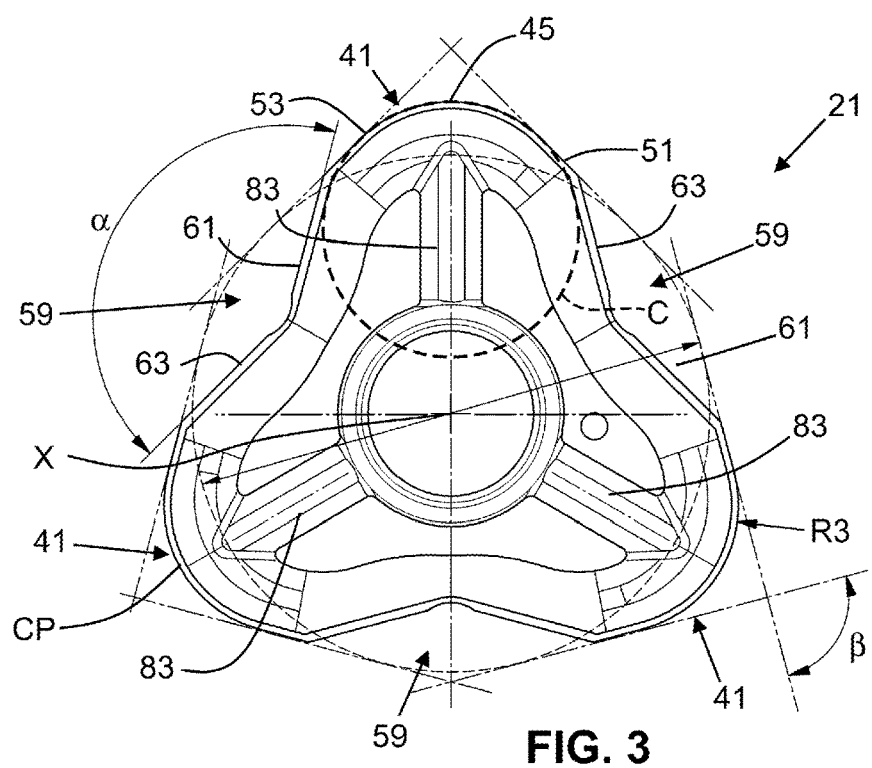
FIG. 3 is a top, plan view of the milling insert of FIG. 1.
Figure 4:
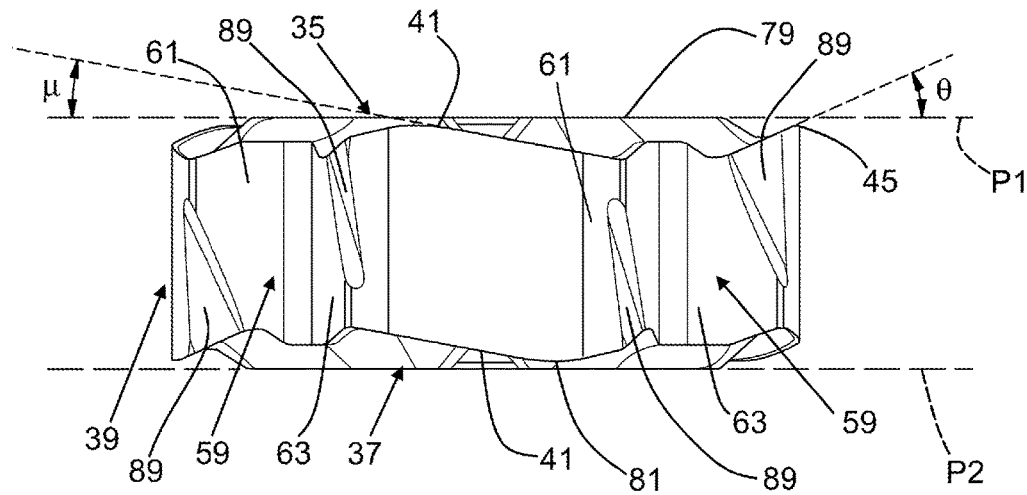
FIG. 4 is a side, plan view of the milling insert of FIG. 1.
Figure 5:
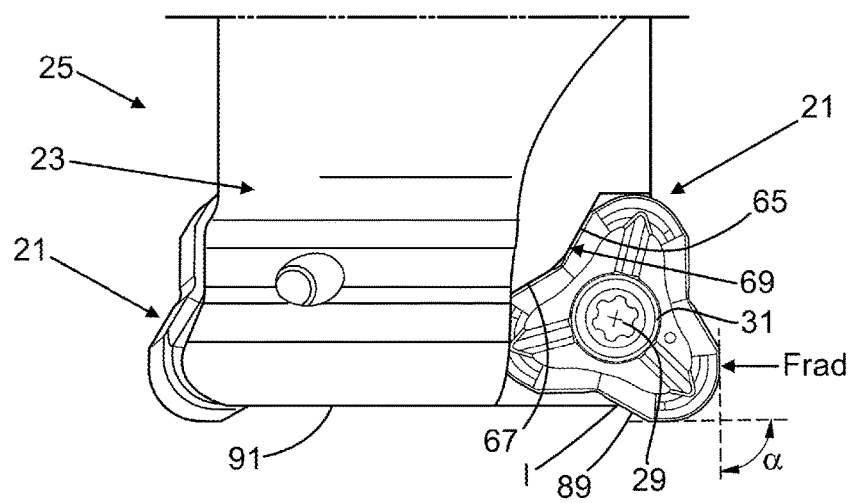
FIG. 5 is a side view of a cutting tool according to an aspect of the present invention.

A milling insert 21 according to an aspect of the present invention is shown in FIGS. 1-5. As seen in FIG. 5, the milling insert 21 is secured to a milling cutter body 23 to form a cutting tool 25. The milling cutter body 23 ordinarily includes a pocket 27, seen without an insert in FIGS. 6 and 7, specially formed for receiving the milling insert 21. The milling insert 21 is secured in the pocket 27 by a suitable clamping arrangement, such as by a screw 29 (FIGS. 5-7) that extends through a central through hole 31 (FIGS. 1-3) in the insert and that has external threads (not shown) that mate with internal threads (not shown) in a hole 33 on the milling cutter body 23 to clamp the insert in the pocket. The milling insert 21 is preferably made from a material such as cemented carbide. The cutting tool 25 illustrated in FIG. 5 is a milling tool, however, the cutting insert can be used in other applications as well, such as rotating tool applications such as boring and drilling applications, and in turning tool applications.

The milling insert 21 includes a first end surface 35 and a second end surface 37. The first and second end surface 35 and 37 will ordinarily be identical if the insert is a two-sided insert, but the insert need not be a two-sided insert, and the end surfaces need not be identical, even in a two-sided insert. A side surface 39 extends between the first end surface 35 and the second end surface 37.

At least one cutting edge 41 is defined by an intersection of at least one of the first end surface 35 and the second end surface 37 with the side surface 39. A land surface 43 such as a T-land may be provided at the cutting edge 41, as well. The at least one cutting edge 41 comprises a radiused component 45 having a first end 47 and a second end 49 and first and second components 51 and 53 at the first and the second ends of the radiused component, respectively. The first and second components 51 and 53 are less curved than the radiused component 45, preferably substantially straight. The first and second components 51 and 53 preferably define a 90 degree angle β (FIG. 3) with each other and are preferably tangent to a circle C (shown in phantom in FIG. 3) that is partially defined by the radiused component of the at least one cutting edge. First and second wiper surfaces 55 and 57 form portions of the side surface 39 behind the first and second substantially straight components or wiper edges 51 and 53 are preferably at an angle 90 degree with each other, as well. The insert 21 thus can have a 90 degree angle between the wiper surfaces 55 and 57 and a 90 degree leading angle of the cutting edge 41. By keeping the contact area along the axially extending portion of the cutting edge 41 small, usually by keeping the lengths of the substantially straight components 51 and 53 short, the radial forces Frad (FIG. 4) on the tool 25 can be decreased during machining, thereby providing a stable machining process.

The side surface 39 comprises at least one concave shape in the form of a valley 59 formed by first and second surfaces 61 and 63. The valley 59 is substantially V-shaped when seen in a top, plan view. The first and second surfaces 61 and 63 may be curved but are preferably flat. The first and second support surfaces 61 and 63 can function as side supporting surfaces that abut against similarly shaped first and second surfaces 65 and 67 (FIGS. 6 and 7) of a convex shape in the form of a ridge 69 of a side wall 71 of the pocket 27 of the milling cutter body 23. The first and second surfaces 65 and 67 may be curved but are preferably flat. The first and second support surfaces 61 and 63 of the at least one valley 59 ordinarily extend an entire distance between the first end surface 35 and the second end surface 37, i.e. in a thickness direction of the milling insert, or at least to edges or lands adjacent the first and second end surfaces. The first and second support surfaces 61 and 63 define an angle α (FIG. 3) between 170 and 130 degrees, more preferably between 160 and 140 degrees, and still more preferably about 150 degrees. The support surfaces 61 and 63 can be formed entirely or at least partially by grinding. Ordinarily, a recess 73 is provided at a corner between the support surfaces 61 and 63 to avoid interference with a peak 75 of the ridge 69, with the peak typically also being rounded or truncated. By providing a valley 59 in the side surface 39 of the insert 21, tendency of the insert 21 to rotate about the screw 29 relative to the milling cutter body 23 can be reduced compared, for example, to a triangular or trigon insert, by virtue of different orientations of forces on the supporting surfaces of the inserts.

The illustrated insert 21 comprises three corners 77. The insert 21 has three cutting edges 41 on at least one side of the insert, with the three cutting edges being defined by the intersection of at least one of the first end surface 35 and the second end surface 37 with the side surface 39. The cutting edges 41 are ordinarily identical. A valley 59 is disposed between each two successive ones of the three cutting edges 41. Typically, the first and second end surfaces 35 and 37 are identical, and the insert 21 comprises exactly three cutting edges 41 defined by the intersection of the first end surface with the side surface 39 and exactly three additional cutting edges defined by the intersection of the second end surface with the side surface so that a total of six cutting edges are provided. Thus, the insert 21 can be indexed relative to the pocket 27 of the milling cutter body 23 to expose different ones of the cutting edges 41 by turning the insert 120 degrees around a central axis X (FIG. 3) extending from the first to the second end surface, or by flipping the insert over.

As seen in FIG. 4, the first end surface 35 comprises a first end supporting surface portion 79 that defines a plane P1 of the first end surface and the (ordinarily identical) second end surface comprises a second end supporting surface portion 81 that defines a plane P2 of the second end surface. The plane P1 of the first end surface 35 and the plane P2 of the second end surface 37 are both perpendicular to the first and second support surfaces 61 and 63 in the at least one valley 59.

Figure 1:
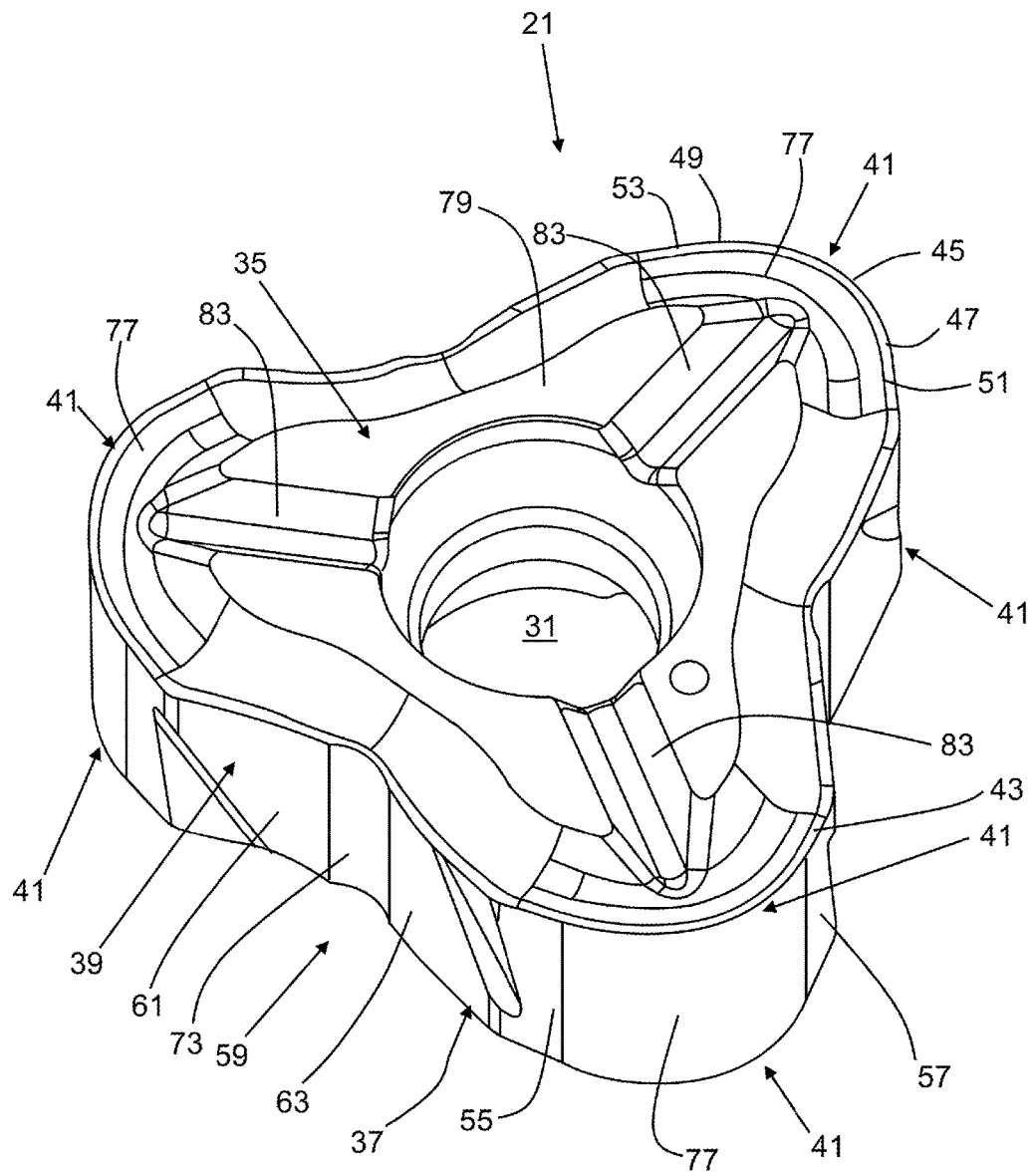
FIG. 1 is a perspective top view of a milling insert according to an aspect of the present invention.
Figure 2:
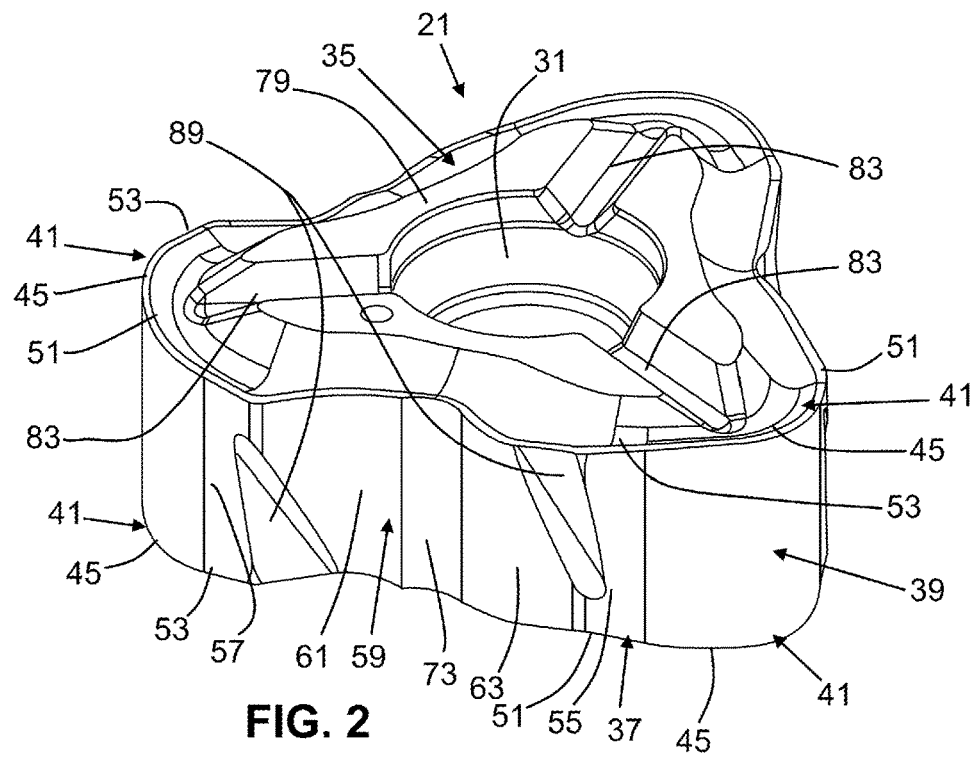
FIG. 2 is a perspective view of the milling insert of FIG. 1 taken closer to perpendicular to the side of the insert than FIG. 1.

As seen, for example, in FIGS. 1-3, at least one insert mounting structure 83 is provided in end supporting surface portions 79 and 81 of the at least one of the first end surface 35 and the second end surface 37 opposite the at least one cutting edge 41. For example, where the insert 21 comprises three cutting edges 41 defined by the intersection of at least one of the first end surface 35 and the second end surface 37 with the side surface 39, at least one respective insert mounting structure 83 corresponding to each of the three cutting edges is provided in the end supporting surface portion of the at least one of the first end surface and the second end surface opposite the one of the first end surface and the second end surface that intersects with the side surface to define the three cutting edges. Thus, when the insert comprises three cutting edges 41 defined by the intersection of the first end surface 35 with the side surface 39 and three cutting edges defined by the intersection of the second end surface 37 with the side surface, at least one respective insert mounting structure 83 corresponding to each of the three cutting edges defined by the intersection of the first end surface with the side surface is provided in an end supporting surface portion of the second end surface, and that at least one respective insert mounting structure corresponding to each of the three cutting edges defined by the intersection of the second end surface with the side surface is provided in an end supporting surface portion of the first end surface, i.e., a total of six cutting edges and at least six respective insert mounting structures.

Figure 6:
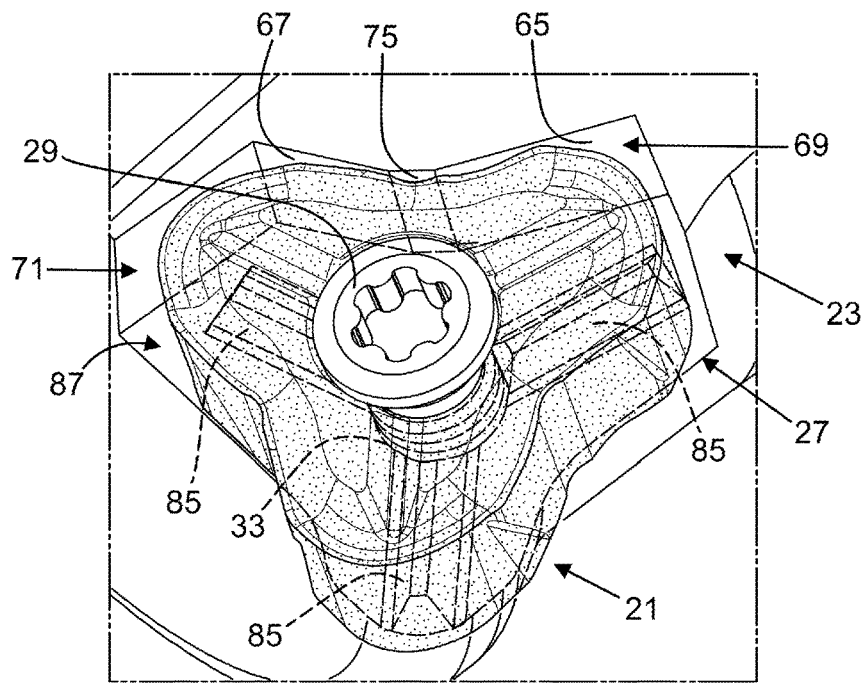
FIG. 6 is a perspective view of a pocket portion of a milling cutter body according to an aspect of the present invention, showing an insert in phantom in the pocket.
Figure 7:
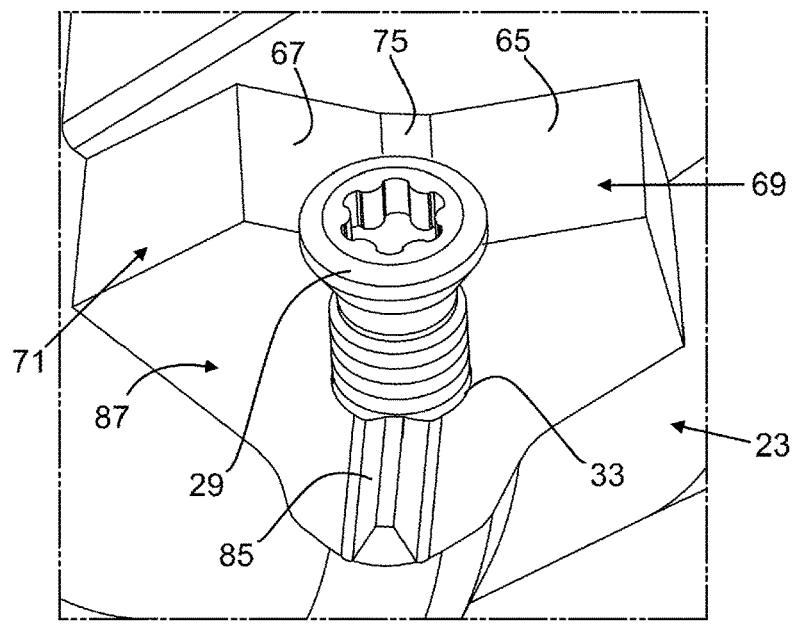
FIG. 7 is a perspective view of a pocket portion of a milling cutter body according to an aspect of the present invention.

In the illustrated insert 21, the insert mounting structures each comprises an elongated slot that is recessed into the end supporting surface portions 79 and 81, however, the insert mounting structures may, alternatively, comprise elongated ridges, or any variety of shapes. The male or female insert mounting structures 83 are intended to mate with corresponding female or male milling cutter body mounting structures 85, e.g., elongated ridges, elongated slots, or other suitable shapes, on the bottom surface 87 of the pocket 27 (FIGS. 6 and 7). FIG. 7 shows a pocket 27 with only a single milling cutter body mounting structure 85. Additional milling cutter body mounting structures may be provided. A female mounting structure, such as 83, may be used also as a coolant channel when supplied with coolant from a clamp or screw.

As seen, for example, in FIG. 3, each insert mounting structure 83 can extend along a line from the central axis X of the milling insert 21 to a center point CP of the radiused component 45 of the at least one cutting edge 41. Where multiple insert mounting structures 83 are provided and mate with corresponding milling cutter body mounting structures 85, they assist in providing good resistance to movement of the insert 21 relative to the milling cutter body 23 during machining, as well as in assisting with proper positioning of the insert relative to the milling cutter body during attachment of the insert to the milling cutter body by the screw 29. Contact between the first and second support surfaces 61 and 63 of the valley 59 with first and second support surfaces 65 and 67 of the ridge 69 of the pocket 27 provide additional resistance to movement. By providing the insert mounting structures 83 with relatively simple shapes, the insert mounting structures can be less likely to interfere with good contact between the first and second support surfaces 61 and 63 of the valley 59 with first and second support surfaces 65 and 67 of the ridge 69.

As seen in FIGS. 1, 2, and 4, a facet 89 can be provided in the side surface 39 at least partially in one of the first and second support surfaces 61 and 63 of the at least one valley 59. The insert 21 is particularly well suited for ramping applications during cutting, while the facet 89 improves clearance from the workpiece during ramping. The main purpose of the facet is to locally provide a smaller insert wedge angle to compensate for axial feed. The position of the facet 89 can correspond to a point I where the side surface 39 of the insert 21 meets a bottom surface 91 of the milling cutter body 23. The insert 21 and cutting tool 25 are particularly well suited for HFC (High Feed Cutting) milling operations and facilitates square shoulder milling, ramping, die/mold machining, helical interpolation, and plunging. The facet 89 may intersect at least one of the first and second wiper surfaces 55 and 57.

By having a negative overall shape, the insert 21 can be quite strong. However, the insert 21 can also be formed to cut materials easily by forming the end surfaces 35 and/or 37 so that, as seen, for example, in FIG. 4, a rake angle Θ of the cutting edge 41 is a positive rake angle, preferably at least 22 degrees and an angle μ is a positive axial angle.

The insert shown in the drawings may have top and bottom supporting surfaces that are partially or entirely recessed below the radiused component 45.

The claimed insert facilitates mounting of the insert securely relative to a toolholder because the first and second flat surfaces forming the valley can function as insert supporting surfaces. As a result of the claimed structure, mounting of the insert in a secure fashion is improved, and the finish of workpieces will be improved as a consequence of the reduced movement of the insert when subjected to forces resulting from a cutting operation.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The invention claimed is:

1. A milling insert, comprising:
   a first end surface;
   a second end surface;
   a side surface extending between the first end surface and the second end surface;
   at least one cutting edge defined by an intersection of at least one of the first end surface and the second end surface with the side surface, wherein the at least one cutting edge includes a radiused component having a first end and a second end and first and second components at the first and the second ends of the radiused component, respectively, the first and second components being less curved than the radiused component, the side surface including at least one substantially V-shaped valley, when seen in a top, plan view of either the first end surface or the second end surface, being formed by first and second support surfaces, wherein the first and second components of the at least one cutting edge are substantially straight and define a 90 degree angle with each other; and
   a facet provided in the side surface at least partially in one of the first and second support surfaces of the at least one valley.

2. The milling insert as set forth in claim 1, wherein the insert includes three cutting edges defined by the intersection of at least one of the first end surface and the second end surface with the side surface, a valley of the at least one valley being disposed between each two successive ones of the three cutting edges.

3. The milling insert as set forth in claim 1, wherein the insert includes exactly three cutting edges defined by the intersection of the first end surface with the side surface and exactly three cutting edges defined by the intersection of the second end surface with the side surface.

4. The milling insert as set forth in claim 1, wherein the first end surface includes a first end supporting surface portion that defines a plane of the first end surface and the second end surface includes a second end supporting surface portion that defines a plane of the second end surface, the plane of the first end surface and the plane of the second end surface both being perpendicular to the first and second support surfaces in the at least one valley.

5. The milling insert as set forth in claim 1, wherein the first and second support surfaces of the at least one valley extend an entire distance between the first end surface and the second end surface.

6. The milling insert as set forth in claim 1, wherein the first and second support surfaces define an angle between 170 and 130 degrees.

7. The milling insert as set forth in claim 1, wherein the first and second components of the at least one cutting edge are substantially straight and tangent to a circle that is partially defined by the radiused component of the at least one cutting edge.

8. The milling insert as set forth in claim 1, wherein at least one insert mounting structure is provided in an end supporting surface portion of at least one of the first end surface and the second end surface opposite the one of the first end surface and the second end surface that intersects with the side surface to define the at least one cutting edge.

9. The milling insert as set forth in claim 8, further comprising three cutting edges defined by the intersection of at least one of the first end surface and the second end surface with the side surface, and that at least one respective insert mounting structure corresponding to each of the three cutting edges is provided in the end supporting surface portion of at least one of the first end surface and the second end surface that intersects with the side surface to define the three cutting edges.

10. The milling insert as set forth in claim 8, further comprising three cutting edges defined by the intersection of the first end surface with the side surface and three cutting edges defined by the intersection of the second end surface with the side surface, and that at least one respective insert mounting structure corresponding to each of the three cutting edges defined by the intersection of the first end surface with the side surface is provided in an end supporting surface portion of the second end surface, and that at least one respective insert mounting structure corresponding to each of the three cutting edges defined by the intersection of the second end surface with the side surface is provided in an end supporting surface portion of the first end surface.

11. The milling insert as set forth in claim 8, wherein the at least one insert mounting structure includes a slot.

12. The milling insert as set forth in claim 8, wherein each insert mounting structure of the at least one insert mounting structure extends along a line from a central axis of the milling insert to a center point of the radiused component of the at least one cutting edge.

13. The milling insert as set forth in claim 1, wherein a rake angle at the at least one cutting edge is a positive rake angle of at least 22 degrees.

* * * * *